Nov. 23, 1965      C. J. REUTER      3,219,258
CONTINUOUS ENVELOPES AND METHOD OF MAKING THEM
Filed Oct. 19, 1962      3 Sheets-Sheet 1
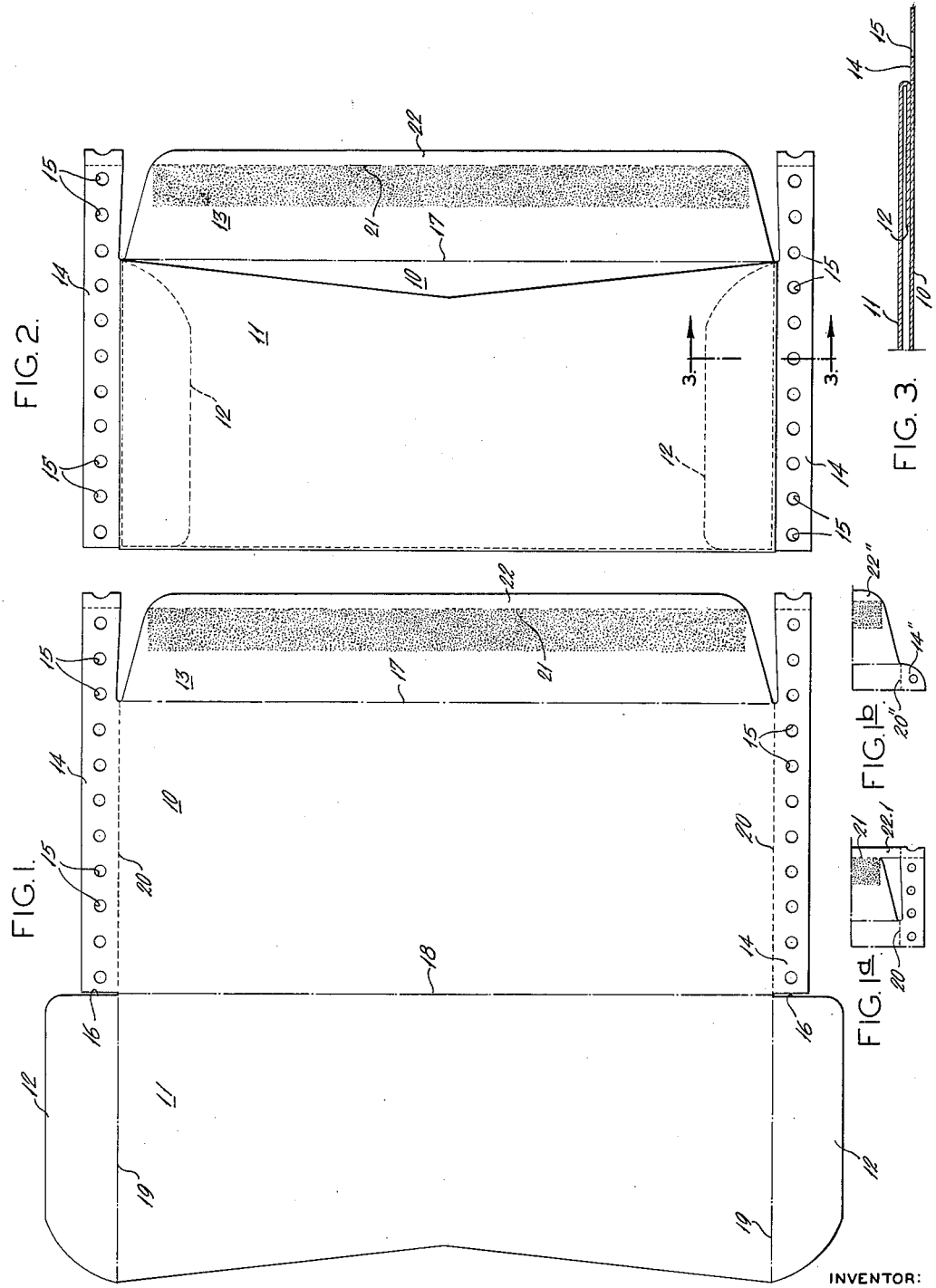
INVENTOR:
CLARENCE J. REUTER
BY Howson & Howson Nov. 23, 1965 C. J. REUTER 3,219,258
CONTINUOUS ENVELOPES AND METHOD OF MAKING THEM
Filed Oct. 19, 1962 3 Sheets-Sheet 3
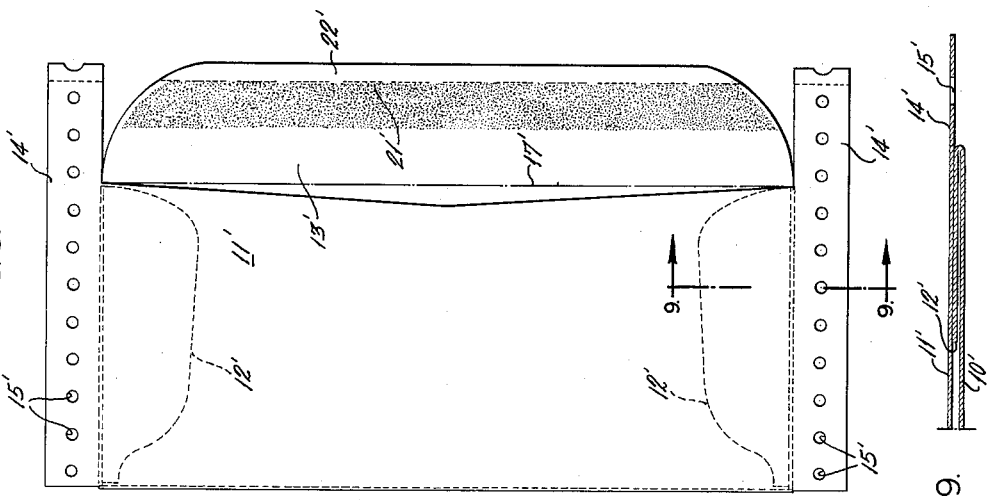
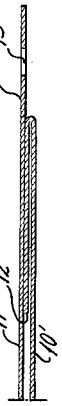
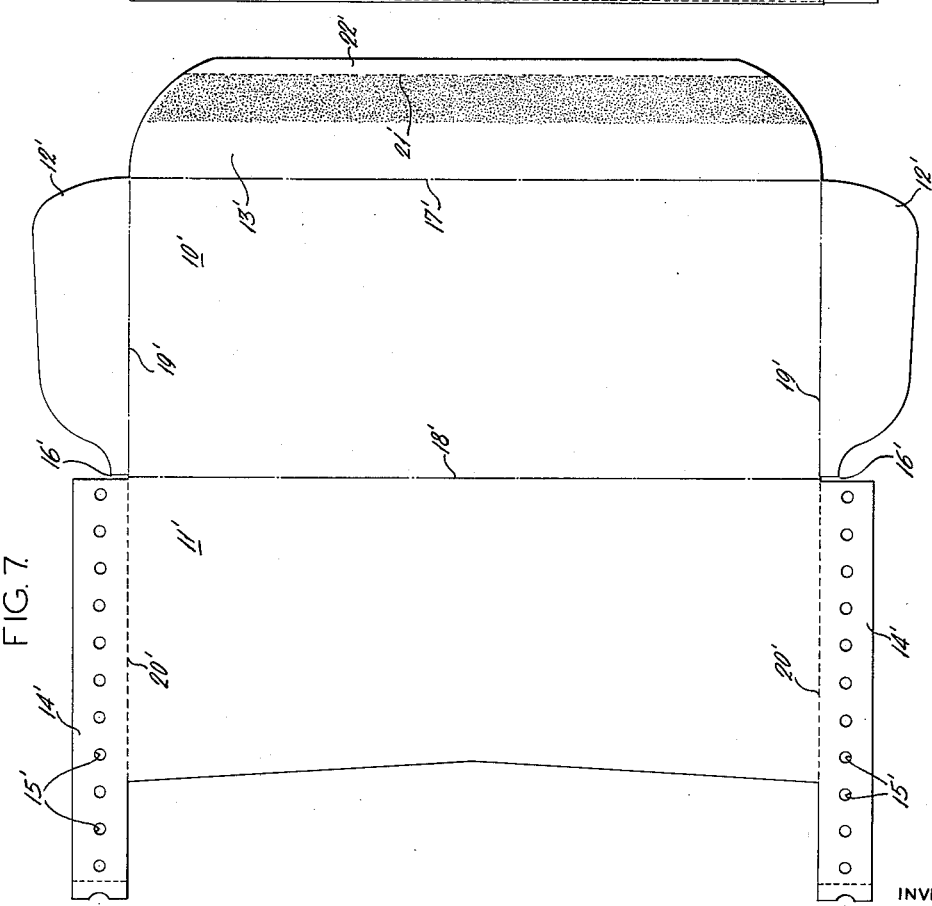
INVENTOR:
CLARENCE J. REUTER
BY Howson & Howson
ATTYS.

United States Patent Office 3,219,258
Patented Nov. 23, 1965

3,219,258
CONTINUOUS ENVELOPES AND METHOD OF
MAKING THEM
Clarence J. Reuter, Springfield, Ill.
(1505 Race St., Philadelphia 2, Pa.)
Filed Oct. 19, 1962, Ser. No. 231,803
12 Claims. (Cl. 229—69)

This invention relates to continuous or strip-connected envelopes suitable for handling as a continuous strip by automatic machinery and has for an object the provision of an improved envelope blank, an improved continuous envelope strip, and an improved method of making and separating the strip into separate envelopes.

Heretofore there have been so-called "continuous envelopes" in which separately formed envelopes were attached, as by disposable flap elements, to continuous sheet strip material with perforated sprocket edges and the envelopes later removed after completion of the necessary strip group operations.

This system is wasteful of material, time and labor and makes a bulky awkward assembly which causes handling difficulties.

Another known type of continuous envelope is formed by combining or laminating two sheets of material with adhesive connections at such locations as to form an envelope, and perforating the edges to form sprocket holes. This system has the disadvantage that the envelope has flat wedge-like peripheral edges due to the laminating method of gluing the sheets together and this makes it difficult to insert articles into and remove them from the envelopes. Also two thicknesses of material must be broken in stripping.

According to the present invention a continuous band or strip of envelopes is formed by a succession of edge-connected envelopes each of which is formed from a single integral piece of material which is die-cut with control margin formations such as edge perforations, folded and glued and edge-connected at the seal flap and back above the bottom edge to form a connected strip. Such an assembly is easy to form, easy to handle, easy to burst to separate the envelopes from each other and to trim to remove the control margins, and very economical of material and labor. It is especially suitable for use in high speed printer output units of data processing computer equipment. It does not require expensive carrier strip construction in which envelopes are carried piggy-back fashion over addressing machines.

Figure 4:
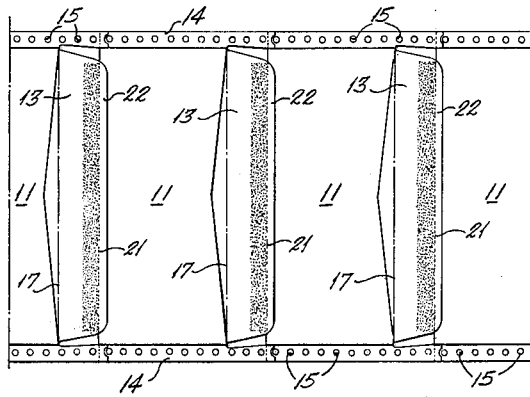
Figure 5:
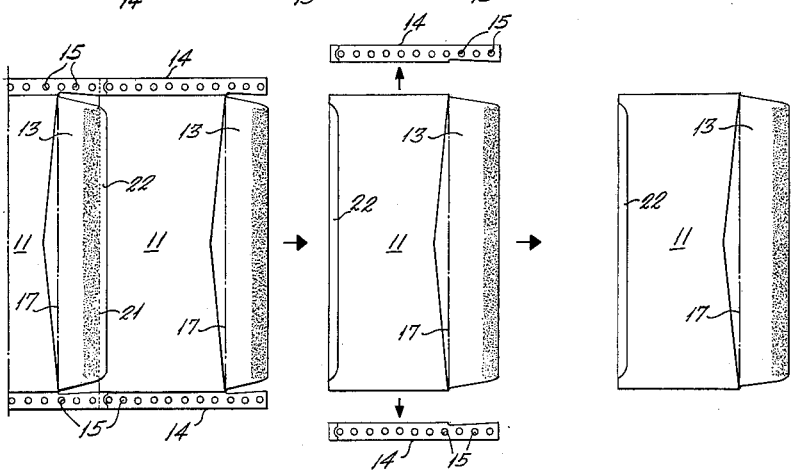
Figure 6:
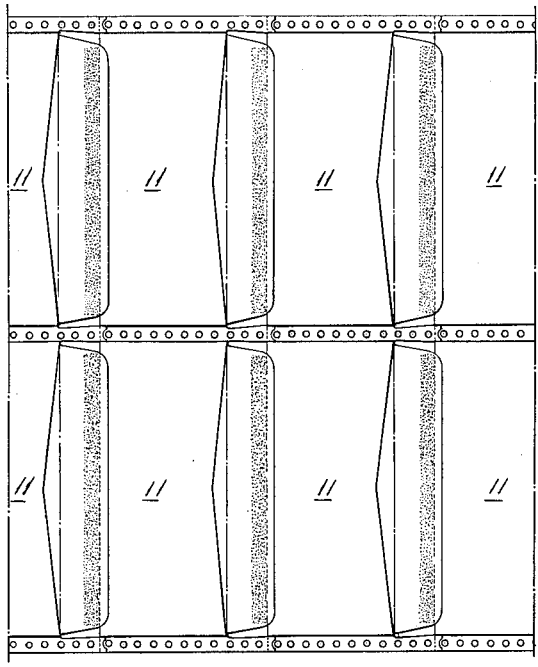

The invention will best be understood from the following description of an exemplary embodiment, reference being made to the accompanying drawings, wherein:

FIG. 1 is a plan view of a die-cut blank;
FIG. 1a is a fragmentary view corresponding to the lower right hand portion of FIG. 1 showing a modified construction.
FIG. 1b is a view similar to FIG. 1a but showing another modified construction;
FIG. 2 is a back plan view of a folded and glued blank;
FIG. 3 is a section taken on the line 3—3 of FIG. 2;
FIG. 4 is a plan view of a continuous strip;
FIG. 5 is a view like FIG. 4 but showing a processed envelope separated from the strip;
FIG. 6 is a view like FIG. 4 but showing a parallel strip assembly;
FIG. 7 is a plan view of a modified blank;
FIG. 8 is a back plan view of a folded and glued blank; and
FIG. 9 is a section taken on the line 9—9 of FIG. 8.

The die-cut blank of FIG. 1 comprises a front panel 10, a rear or back panel 11, end connecting or side seam flaps 12, a sealing flap 13, and control margin strip flaps 14 with spaced sprocket tooth receiving holes 15. The die operation makes cuts 16 between the end or side seam flaps 12 and the margin control strip flaps 14; also rule-formed crease lines 17 and 18 at the top and bottom edges of the front panel 10 to facilitate folding the sealing flap 13 and the back panel 11 respectively; also crease lines 19 for the end flaps 12; also perforations or lines of weakening 20 for the margin control strip flaps 14; and a transverse line of weakening or perforations 21 between the sealing flap proper 13 and the margin control strip flaps 14 on the one hand and strip-connecting tear-off sealing flap extension 22 on the other hand.

Instead of having gaps between the ends of the sealing flap 13 and the margin control strip flaps 14, as shown, the tear-off sealing flap extension 22.1 could extend without break across the full width of the blank, as shown in FIG. 1a, in which case the lines of weakening 20 would extend across the tear-off flap extension.

As another modification, shown in FIG. 1b, the sealing flap extension 22" has the same length as in FIG. 1 and forms the only strip-connecting element, the margin control strip flaps 14" being only as long as the width of the front panel 10. This is suitable for long tractor type feed devices with five or seven feed pins which are capable of spanning the gaps.

After the blanking operation the end seam flaps 12 (with adhesive provided on the rear side, as viewed in FIG. 1) are folded over on the back panel at the crease lines 19; then the rear panel 11 is folded at the crease line 18 on the front panel; and the end seam flaps 12 are glued to the inside surface of the front panel 10 to form an envelope. This condition is shown in FIG. 2. The envelope is of the normal type and not the wedge-margin type which is formed by gluing two sheets together flatwise. The perforated single-thickness margin control strip flaps 14 now extend for the full length (width) of the ends of the front panel 10 and sealing flap 13 (with extension 22) of the envelope. The back of the extension 22 and the backs of the ends of the margin control strip flaps 14 are provided with adhesive.

Next the back of the flap extension 22 and the ends of the margin control strip flaps 14 of one envelope unit are glued to the back panel of another envelope unit (shown connected near the bottom edge) and this is continued until a band or strip of any desired length is formed. FIG. 4 shows the continuous band or strip thus formed. The bands or strips are usually folded into single or multiple envelope lengths, as along the weakened lines 21, for handling by automatic equipment.

Tractor-type pin-bearing belts, plates or rolls may be used to bring the units into correct assembly position so that all spaces between sprocket holes are of uniform length. Tractor-type pin-bearing belts or plates are also commonly used on the automatic machinery for advancing the strips.

It is customary to print the envelopes and apply sealing flap adhesive before the envelopes are connected into strip form. A common practice will be to prepare such preprinted and adhesive-applied continuous strips in flat-folded packs to sell to the customer who will use them in automatic machines for addressing, filling, stamping and the like operations.

After all desired operations have been performed on the strips, the units are pulled apart or stripped by bursting machinery at the weakened lines 21; and the marginal control strip flaps 14 are cut or pulled off at the weakened lines 20, as shown in FIG. 5. The present article is very well adapted for the automatic bursting and control strip separation operations because only a single thickness of sheet material is involved in each case and this is perforated or otherwise weakened at the tear-off lines.

The small connecting tear extension 22 which is left on the envelopes is on the back so that it does not show from the front; and the end tear lines come at the ends of the envelope where they are hardly visible. The final envelope (right side of FIG. 5) is practically normal in appearance and it is entirely normal in use because the entire inside space for the full area of the front panel is fully open out to the edges and there are no wedge margins to unduly interfere with filling or to improperly retain items in empting the envelopes.

FIG. 6 shows how strips can readily be assembled side-by-side in parallel, here two edge control strip flaps being overlapped and glued together. This could be continued for more than two strips in parallel, if desired. Normal bursting and edge-removing machines can readily handle multiple width bands or strips.

The modified form shown in FIGS. 7 to 9 includes most of the features of the first form, the main difference being that the end seam flaps 12' are formed on the ends of the front panel 10' instead of on the ends of the back panel; that the margin control strip flaps 14' are formed on the ends of the back panel instead of the front panel; that the end flaps 12' are glued to the inside of the back panel instead of the front panel; and that the sealing flap 13' of one blank is cut out of the space between projecting ends of the margin control strip flaps 14' of another blank. The margin control strip flaps 14' are torn from the back panel instead of the front panel and this can in some measure conceal the tear lines from the front. In other respects both forms are alike and the same reference characters are used, with a prime (') for the second form.

It is thus seen that the invention provides a very simple and inexpensive blank, strip and method, which furnishes envelopes of full inside spaced which can be filled and emptied in the usual way by usual apparatus; which provides a thin strip which will feed easily through handling machines; which provides a strip which can be stripped easily; which has very little waste material; and which provides a final envelope which is substantially normal in appearance and use.

While certain embodiments of the invention have been described for purposes of illustration it is to be understood that there may be various embodiments and modifications within the general scope of the invention.

I claim:

1. A continuous envelope strip unit, comprising in combination, an integral continuous sheet blank having a front panel, a back panel, a sealing flap connected to the transverse edge of the front panel distant from the transverse edge to which the back panel is connected, end seam flaps connected to the ends of one of said panels, and sprocket-hole-perforated margin control strip flaps connected to the ends of the other panel, said sealing flap having its outer edge free and having a transverse weakened tear-off line at a distance from the end to define a sealing flap extension for subsequent connection of the strip unit to an adjacent strip unit to form a continuous strip of envelopes.

2. A continuous envelope strip unit, comprising in combination, an integral continuous sheet blank having a front panel, a back panel, a sealing flap connected to the transverse edge of the front panel distant from the transverse edge to which the back panel is connected, end seam flaps connected to the ends of one of said panels, and sprocket-hole-perforated margin control strip flaps connected to the ends of the other panel, said margin control strip flaps being as long as the ends of the front panel and the sealing flap.

3. A continuous envelope strip unit as set forth in claim 1, in which said end seam flaps are connected to the ends of the back panel for folded securement to the front panel, and in which said margin control strip flaps are connected to the ends of the front panel and extend beyond the front panel alongside the ends of the sealing flap.

4. A continuous envelope strip unit as set forth in claim 1, in which said end seam flaps are connected to the ends of the front panel for folded securement to the back panel, and in which said margin control strip flaps are connected to the ends of the back panel.

5. A continuous envelope strip unit as set forth in claim 1, in which longitudinal weakened lines are provided at the connections of the margin control strip flaps with the panel.

6. A continuous envelope strip unit as set forth in claim 2, in which longitudinal weakened lines are provided at the connections of the margin control strip flaps with the panel.

7. A continuous envelope strip formed of a plurality of units as set forth in claim 1 secured together by an overlapped adhesive connection between a sealing flap extension of one unit to the lower portion of the back of a like unit, leaving at least the full face of the front panel exposed.

8. A continuous envelope strip formed of a plurality of units as set forth in claim 2, with the end seam flaps of one panel folded over and glued to the other panel to form an envelope of each unit, with the sealing flap and margin control flaps extended and glued to the lower portion of the back of a like unit, leaving at least the full face of the front panel exposed.

9. A continuous envelope strip formed of a plurality of units as set forth in claim 2, with the end seam flaps of one panel folded over and glued to the other panel to form an envelope of each unit, with the sealing flap and margin control flaps extended and glued to the bottom edge of the back of a like unit, leaving the full face of the front panel and a major portion of the back of the sealing flap exposed.

10. A continuous envelope strip formed of a plurality of units as set forth in claim 1 arranged in parallel with adjacent margin control strip flaps of the side-adjacent units overlapped and secured together and with envelope units in each parallel strip secured together by a connection between a sealing flap extension of one unit to the back panel of a like unit.

11. The method of making a continuous envelope strip which comprises, forming a one-piece integral blank including a front panel, a back panel, a sealing flap on the top of the front panel, end seam flaps connected to one of said panels, sprocket-hole perforated margin control strip flaps connected to the other panel, making weakened lines at the inner edges of the margin control strip flaps, making a weakened transverse line across the upper end of the sealing flap to form a strip connection-forming extension, folding over the end seam flaps and folding the front panel and back panel together and gluing the end seam flaps carried by one panel to the other panel to form an envelope, and gluing the backs of flap extensions and ends of the margin control strip flaps to the lower edge of the back panels and control strip flaps of adjacent units in succession to form a strip.

12. The method as set forth in claim 11, which further includes the final steps of stripping processed envelopes from the strip by bursting apart along said weakened lines of the sealing flaps extensions and margin control strip flaps and separating the margin control strip flaps from the panel to which they are connected.

References Cited by the Examiner

UNITED STATES PATENTS

| | | | |
|---|---|---|---|
| 1,893,986 | 1/1933 | Keller | 229—69 |
| 2,464,490 | 3/1949 | Davies | 229—69 |
| 2,474,775 | 6/1949 | Borchers | 93—61 |
| 2,723,076 | 11/1955 | Whitman | 229—69 |
| 2,790,593 | 4/1957 | Reuter | 229—69 |
| 2,824,685 | 2/1958 | Patton | 229—69 |
| 2,988,969 | 6/1961 | Stratton et al. | 93—61 |

FRANKLIN T. GARRETT, *Primary Examiner.*

FRANK E. BAILEY, *Examiner.*